UNITED STATES PATENT OFFICE.

RICHARD BIRDSALL, OF CORNWALL, NEW YORK.

IMPROVEMENT IN FERTILIZING COMPOUNDS TO BE USED TO PROTECT TREES, &c.

Specification forming part of Letters Patent No. 147,035, dated February 3, 1874; application filed September 18, 1873.

*To all whom it may concern:*

Be it known that I, RICHARD BIRDSALL, of Cornwall, county of Orange and State of New York, have invented a new Compound and Fertilizer, to be used in the protection of trees, shrubs, and vegetables from insects and worms, and, particularly, in the culture of strawberries, and the protection of the plant from injury by its enemies, of which the following is a specification:

The nature of my invention consists in incorporating into a compound gas-lime, earth, or top soil, salt, spirits of turpentine, saltpeter, and crude coal-oil, or their chemical equivalents.

To prepare this fertilizer, the following proportions are found to produce the required results in the protection of trees and shrubs, and the culture of vegetables and small fruits, and especially strawberries; but these proportions may be varied, and the chemical equivalents of the several ingredients substituted, without departing from my invention.

To about eight bushels of good earth—"top soil"—add one bushel of gas-lime, four quarts common salt, two quarts spirits of turpentine, two pounds of saltpeter, and two quarts of crude coal-oil, with sufficient water to cause the whole to adhere while being thoroughly incorporated into a homogeneous mass. After having thoroughly commingled the various component parts, the whole is allowed to remain in bulk, say, about four weeks, when it assumes a finely-pulverized condition, and is ready for use.

Care should be taken to keep this fertilizer under shelter and dry until used.

To apply to trees and shrubs, bare the roots, and sprinkle a small quantity about them; then replace the soil, covering the fertilizer to protect it, and preserve its strength to the roots of the tree or shrub.

In applying this fertilizer to trees or shrubs, it is unnecessary to destroy the worm or its larvæ, but simply lay bare the roots to the necessary depth, when both worm or insect and larvæ will be destroyed thereby.

For vegetables, it may be applied with great benefit in the hills or rows, the same as other fertilizers of similar character, or bone-dust, and which will not only protect the vegetables from injury by worms and insects, but materially increase their growth and yield.

In the culture of strawberries, this fertilizer is especially beneficial. Apply a small quantity—about one teaspoonful—to the roots of the new plant, covering the same with a coating of good soil, thereby protecting the fertilizer from the sun, and confining it to the roots of the plant. After the season of picking, apply a second dressing of fertilizer, with a covering of soil, having prepared the vines by the removal of all weeds. Each season the dressing of the vines by the fertilizer is repeated, with their covering of top soil, by which the plants may be preserved in good bearing for an indefinite length of time, and the quantity and quality of fruit much improved.

Having thus fully described my invention, what I claim therein as new, and desire to secure by Letters Patent, is—

A compound or fertilizer composed of the several ingredients herein mentioned, or their chemical equivalents.

RICHARD BIRDSALL.

Witnesses:
JOSHUA WARD,
EGBERT P. STOVER.